(12) United States Patent
Mannattil et al.

(10) Patent No.: US 11,924,204 B1
(45) Date of Patent: *Mar. 5, 2024

(54) TWO-WAY AUTHENTICATION SYSTEM AND METHOD

(71) Applicant: Wells Fargo Bank, N.A., San Francisco, CA (US)

(72) Inventors: Vinod Mannattil, Ts (IN); Satyavathi Divadari, Bengaluru (IN); Sridhara Rao Sidhu, Bengaluru (IN); Rameshchandra Bhaskar Ketharaju, Hyderabad (IN)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/645,717

(22) Filed: Dec. 22, 2021

Related U.S. Application Data

(63) Continuation of application No. 16/003,805, filed on Jun. 8, 2018, now Pat. No. 11,303,632.

(51) Int. Cl.
*H04L 9/40* (2022.01)
*G06Q 30/01* (2023.01)
(Continued)

(52) U.S. Cl.
CPC ......... *H04L 63/0869* (2013.01); *G06Q 30/01* (2013.01); *G06Q 50/265* (2013.01);
(Continued)

(58) Field of Classification Search
None
See application file for complete search history.

(56) References Cited

U.S. PATENT DOCUMENTS

| | | | | |
|---|---|---|---|---|
| 5,999,609 A | * | 12/1999 | Nishimura | ...... H04M 3/5183 379/201.01 |
| 6,320,947 B1 | * | 11/2001 | Joyce | ........ H04M 15/85 379/112.01 |

(Continued)

OTHER PUBLICATIONS

Bhattacharjee et al "Mutual Authentication Technique Applying Three Entities in 4-G Mobile Communications," International Journal of Computer Theory and Engineering, vol. 3, No. 6, Dec. 2011, pp. 732-737 (Year: 2011).*

(Continued)

*Primary Examiner* — Luu T Pham
*Assistant Examiner* — James J Wilcox
(74) *Attorney, Agent, or Firm* — K&L Gates LLP

(57) ABSTRACT

The innovation disclosed and claimed herein, in one aspect thereof, comprises systems and methods of authenticating customers and service agents. The innovation receives a connection request to connect a customer and a service agent. The customer is authenticated for the service agent by matching biometric data of the customer to previously stored biometric data using a biometric recognition algorithm. The service agent is authenticated for the customer by matching a unique identifier to a previously stored unique identifier. A confirmation notification is generated and sent to the service agent and the customer to confirm the authentications. A connection is established between the customer and the service agent according to the authentications and the connection request.

20 Claims, 6 Drawing Sheets

(51) Int. Cl.
*G06Q 50/26* (2012.01)
*G06V 40/16* (2022.01)
(52) U.S. Cl.
CPC ........ *G06V 40/172* (2022.01); *H04L 63/0861* (2013.01); *H04L 63/0876* (2013.01)

(56) References Cited

U.S. PATENT DOCUMENTS

| | | | |
|---|---|---|---|
| 6,487,660 B1 | 11/2002 | Vanstone et al. | |
| 6,850,252 B1* | 2/2005 | Hoffberg | H04N 21/475 380/252 |
| 7,181,017 B1* | 2/2007 | Nagel | H04L 9/0841 380/282 |
| 7,480,907 B1* | 1/2009 | Marolia | G06F 8/65 717/172 |
| 8,126,449 B2* | 2/2012 | Beenau | G06Q 30/06 455/419 |
| 8,346,672 B1 | 1/2013 | Weiner et al. | |
| 8,484,482 B1* | 7/2013 | Cherukumudi | G06F 21/31 713/180 |
| 8,613,070 B1* | 12/2013 | Borzycki | H04L 67/104 726/8 |
| 8,621,209 B1* | 12/2013 | Johansson | H04L 63/08 713/170 |
| 9,020,121 B1* | 4/2015 | Dhanda | H04M 7/0036 379/266.04 |
| 9,077,699 B1* | 7/2015 | James | H04L 51/046 |
| 9,338,164 B1 | 5/2016 | Liu et al. | |
| 9,344,892 B1* | 5/2016 | Rodrigues | H04M 15/848 |
| 9,412,103 B1* | 8/2016 | d'Escragnolle | H04M 3/5232 |
| 9,432,378 B1 | 9/2016 | Svigals | |
| 9,485,237 B1* | 11/2016 | Johansson | H04L 9/3271 |
| 9,519,853 B2 | 12/2016 | Tolle | |
| 9,613,345 B2 | 4/2017 | Salihi | |
| 9,762,562 B2 | 9/2017 | Maguire et al. | |
| 9,774,728 B2 | 9/2017 | Jung et al. | |
| 9,979,725 B1 | 5/2018 | Liu et al. | |
| 10,152,718 B1* | 12/2018 | Janefalkar | G06F 21/629 |
| 10,298,759 B1 | 5/2019 | Ross et al. | |
| 10,395,209 B2 | 8/2019 | Koo | |
| 10,395,290 B1 | 8/2019 | Koo | |
| 10,601,989 B1* | 3/2020 | Janefalkar | H04L 63/08 |
| 11,303,632 B1* | 4/2022 | Mannattil | H04L 63/0869 |
| 11,405,189 B1* | 8/2022 | Bennison | H04L 9/0656 |
| 11,424,911 B2* | 8/2022 | Narayanaswami | H04L 9/0637 |
| 2002/0010679 A1* | 1/2002 | Felsher | G06F 21/6245 705/51 |
| 2002/0118800 A1* | 8/2002 | Martinez | H04M 3/436 379/67.1 |
| 2002/0178271 A1* | 11/2002 | Graham | H04L 63/101 709/229 |
| 2003/0120502 A1* | 6/2003 | Robb | G06Q 30/04 705/34 |
| 2003/0140227 A1* | 7/2003 | Asano | H04L 9/0836 713/157 |
| 2003/0142824 A1* | 7/2003 | Asano | H04L 63/062 380/277 |
| 2003/0172090 A1* | 9/2003 | Asunmaa | H04L 63/06 |
| 2003/0185396 A1* | 10/2003 | Asano | H04L 9/0822 380/277 |
| 2004/0249955 A1* | 12/2004 | Wuerful | H04L 65/1069 709/227 |
| 2005/0060561 A1* | 3/2005 | Pearson | G06F 21/57 713/194 |
| 2005/0273399 A1* | 12/2005 | Soma | G06Q 20/401 707/758 |
| 2006/0165040 A1* | 7/2006 | Rathod | G06Q 10/10 370/335 |
| 2006/0165060 A1* | 7/2006 | Dua | G06Q 20/401 705/76 |
| 2007/0018786 A1* | 1/2007 | Shan | H04M 15/43 340/5.4 |
| 2007/0067794 A1* | 3/2007 | Russell | H04N 21/6405 725/9 |
| 2007/0079136 A1* | 4/2007 | Vishik | G06F 21/335 713/186 |
| 2007/0087756 A1* | 4/2007 | Hoffberg | G06Q 10/06375 455/450 |
| 2007/0136800 A1 | 6/2007 | Chan et al. | |
| 2007/0186103 A1* | 8/2007 | Randle | G06F 21/31 713/168 |
| 2007/0282951 A1* | 12/2007 | Selimis | H04L 69/08 709/205 |
| 2008/0010673 A1* | 1/2008 | Makino | G06F 21/31 726/6 |
| 2008/0077795 A1 | 3/2008 | MacMillan | |
| 2008/0095327 A1* | 4/2008 | Wlasiuk | G10L 15/1822 379/88.01 |
| 2008/0095331 A1* | 4/2008 | Wlasiuk | H04M 3/4938 704/E15.045 |
| 2008/0174675 A1* | 7/2008 | Miki | H04N 5/772 386/E5.072 |
| 2009/0063685 A1* | 3/2009 | Common | G06F 21/34 709/227 |
| 2009/0079539 A1* | 3/2009 | Johnson | G06V 40/10 340/5.83 |
| 2009/0144554 A1 | 6/2009 | Baker | |
| 2009/0198618 A1* | 8/2009 | Chan | G06F 21/445 707/E17.014 |
| 2009/0307491 A1* | 12/2009 | Nakatsugawa | G07F 7/1016 713/169 |
| 2010/0174564 A1* | 7/2010 | Stender | G06Q 10/10 709/206 |
| 2010/0241595 A1* | 9/2010 | Felsher | G16H 10/65 707/E17.014 |
| 2010/0259719 A1* | 10/2010 | Sabeta | G06Q 30/0601 705/26.1 |
| 2010/0291904 A1* | 11/2010 | Musfeldt | H04L 41/5041 455/414.1 |
| 2010/0316213 A1* | 12/2010 | Goel | H04M 3/51 379/265.09 |
| 2010/0333186 A1 | 12/2010 | Chan et al. | |
| 2011/0084834 A1* | 4/2011 | Sabeta | G06K 19/077 340/540 |
| 2011/0103698 A1 | 5/2011 | Hayashi et al. | |
| 2011/0165836 A1* | 7/2011 | Dixon | G06Q 20/3278 455/41.1 |
| 2011/0165866 A1* | 7/2011 | Dixon | G07B 15/00 455/414.1 |
| 2011/0166914 A1* | 7/2011 | Dixon | G06Q 20/354 705/13 |
| 2011/0166924 A1* | 7/2011 | Joa | G06Q 30/0243 705/14.42 |
| 2011/0166931 A1* | 7/2011 | Joa | G06Q 30/0255 707/705 |
| 2011/0166936 A1* | 7/2011 | Dixon | G06Q 50/30 705/14.58 |
| 2011/0191166 A1* | 8/2011 | Joa | G06Q 30/0246 705/14.45 |
| 2011/0286584 A1* | 11/2011 | Angel | H04M 3/42221 379/88.02 |
| 2011/0287748 A1* | 11/2011 | Angel | H04M 7/0054 455/414.1 |
| 2012/0046110 A1* | 2/2012 | Amaitis | A63F 13/87 463/43 |
| 2012/0057705 A1 | 3/2012 | Shah et al. | |
| 2012/0058826 A1* | 3/2012 | Amaitis | A63F 13/35 463/43 |
| 2012/0102551 A1 | 4/2012 | Bidare | |
| 2012/0110661 A1 | 5/2012 | Tverskoy et al. | |
| 2012/0198241 A1* | 8/2012 | O'Hare | H04L 63/0428 713/189 |
| 2012/0304255 A1* | 11/2012 | Carnes | H04W 12/033 726/3 |
| 2013/0065564 A1* | 3/2013 | Conner | G06K 19/0718 340/5.82 |
| 2013/0174241 A1* | 7/2013 | Cha | H04L 63/0815 726/7 |

(56) References Cited

U.S. PATENT DOCUMENTS

| | | | |
|---|---|---|---|
| 2013/0204785 A1* | 8/2013 | Monk | G06Q 20/326 705/44 |
| 2013/0225282 A1* | 8/2013 | Williams | G07F 17/3241 463/29 |
| 2013/0237204 A1* | 9/2013 | Buck | G01S 19/16 455/418 |
| 2013/0244632 A1* | 9/2013 | Spence | H04M 3/5183 455/415 |
| 2013/0282438 A1* | 10/2013 | Hunter | G06Q 30/0201 705/7.32 |
| 2014/0032758 A1* | 1/2014 | Barton | H04L 41/00 709/225 |
| 2014/0033271 A1* | 1/2014 | Barton | H04W 12/64 726/1 |
| 2014/0033292 A1* | 1/2014 | Moore | G06F 21/43 726/9 |
| 2014/0040979 A1* | 2/2014 | Barton | H04W 12/30 726/1 |
| 2014/0156396 A1* | 6/2014 | deKozan | G06Q 30/0255 705/14.53 |
| 2014/0164776 A1* | 6/2014 | Hook | G06F 21/6218 713/171 |
| 2014/0330563 A1* | 11/2014 | Faians | G10L 17/04 704/236 |
| 2015/0067819 A1* | 3/2015 | Shribman | H04L 67/06 709/218 |
| 2015/0082399 A1* | 3/2015 | Wu | H04L 63/0838 726/10 |
| 2015/0095986 A1* | 4/2015 | Karpey | H04L 63/08 726/4 |
| 2015/0134756 A1* | 5/2015 | Willis | H04L 51/216 709/206 |
| 2015/0135261 A1 | 5/2015 | Park et al. | |
| 2015/0227890 A1* | 8/2015 | Bednarek | G06Q 10/0833 705/26.81 |
| 2015/0228004 A1* | 8/2015 | Bednarek | G06Q 30/0633 705/26.8 |
| 2015/0302394 A1* | 10/2015 | Harper | G06Q 20/10 705/41 |
| 2015/0317642 A1* | 11/2015 | Argue | G06Q 30/01 705/317 |
| 2015/0381621 A1* | 12/2015 | Innes | H04W 12/069 726/7 |
| 2016/0012465 A1* | 1/2016 | Sharp | G06Q 20/321 705/14.17 |
| 2016/0048562 A1* | 2/2016 | Joa | G06Q 30/0255 707/756 |
| 2016/0048867 A1* | 2/2016 | Joa | G06Q 30/0243 705/14.42 |
| 2016/0065571 A1 | 3/2016 | Hoyos et al. | |
| 2016/0086190 A1 | 3/2016 | Bohrer et al. | |
| 2016/0105408 A1* | 4/2016 | Cooper | H04L 63/08 726/3 |
| 2016/0142545 A1* | 5/2016 | Gajjar | H04L 61/5007 379/196 |
| 2016/0162905 A1* | 6/2016 | Singh | G06F 21/31 705/304 |
| 2016/0173690 A1 | 6/2016 | Perez et al. | |
| 2016/0224774 A1* | 8/2016 | Pender | G06F 21/32 |
| 2016/0255505 A1* | 9/2016 | Oberheide | G06Q 20/326 726/7 |
| 2016/0277439 A1 | 9/2016 | Rotter et al. | |
| 2016/0323745 A1* | 11/2016 | Pender | G06Q 20/10 |
| 2016/0342911 A1 | 11/2016 | Kannan et al. | |
| 2016/0364732 A1* | 12/2016 | Jagatheesan | H04L 67/52 |
| 2017/0017964 A1* | 1/2017 | Janefalkar | H04W 12/04 |
| 2017/0019531 A1* | 1/2017 | Janefalkar | H04M 3/5231 |
| 2017/0019784 A1* | 1/2017 | Janefalkar | H04W 12/06 |
| 2017/0031063 A1 | 2/2017 | Kim et al. | |
| 2017/0093851 A1 | 3/2017 | Allen | |
| 2017/0163689 A1 | 6/2017 | Ylonen | |
| 2017/0195327 A1 | 7/2017 | Lee et al. | |
| 2017/0201498 A1* | 7/2017 | Baig | H04L 9/0618 |
| 2017/0223017 A1* | 8/2017 | Kohli | H04L 63/0853 |
| 2017/0230179 A1* | 8/2017 | Mannan | H04L 9/3226 |
| 2017/0250796 A1* | 8/2017 | Samid | H04L 9/0838 |
| 2017/0286651 A1* | 10/2017 | Erhart | B25J 19/023 |
| 2017/0296919 A1 | 10/2017 | Margiotta | |
| 2017/0310631 A1 | 10/2017 | Yalcinalp et al. | |
| 2017/0318012 A1* | 11/2017 | Kim | H04L 69/18 |
| 2017/0318152 A1* | 11/2017 | Chen | H04M 3/42068 |
| 2017/0323005 A1 | 11/2017 | Raymond et al. | |
| 2017/0329944 A1* | 11/2017 | Satyavarapu | G06F 21/31 |
| 2017/0330191 A1* | 11/2017 | Pender | G06Q 20/3221 |
| 2017/0331824 A1* | 11/2017 | Pender | H04L 63/0892 |
| 2017/0332233 A1* | 11/2017 | Zhang | H04M 15/47 |
| 2017/0346851 A1* | 11/2017 | Drake | H04L 9/0838 |
| 2017/0374199 A1 | 12/2017 | Truitt et al. | |
| 2018/0027029 A1* | 1/2018 | Linder | G06Q 30/016 709/204 |
| 2018/0041508 A1 | 2/2018 | Jass et al. | |
| 2018/0061155 A1* | 3/2018 | Ghorpade | G07C 9/37 |
| 2018/0063709 A1 | 3/2018 | Morrison | |
| 2018/0075104 A1 | 3/2018 | Oberbreckling et al. | |
| 2018/0115788 A1 | 4/2018 | Burns et al. | |
| 2018/0191501 A1* | 7/2018 | Lindemann | H04L 9/0833 |
| 2018/0191695 A1* | 7/2018 | Lindemann | H04L 63/0853 |
| 2018/0198914 A1* | 7/2018 | Firke | H04M 1/72403 |
| 2018/0212911 A1 | 7/2018 | Smith et al. | |
| 2018/0219889 A1 | 8/2018 | Oliner et al. | |
| 2018/0219897 A1 | 8/2018 | Muddu et al. | |
| 2018/0247082 A1* | 8/2018 | Durham | G06F 9/45558 |
| 2019/0026747 A1 | 1/2019 | Kim et al. | |
| 2019/0036678 A1* | 1/2019 | Ahmed | H04L 9/008 |
| 2019/0089699 A1* | 3/2019 | Krishnamurthy | H04W 4/16 |
| 2019/0386814 A1* | 12/2019 | Ahmed | H04L 9/008 |
| 2019/0392424 A1* | 12/2019 | Wilson | G06Q 20/343 |
| 2020/0007513 A1* | 1/2020 | Gleichauf | G06F 21/105 |
| 2020/0057664 A1* | 2/2020 | Durham | G06F 21/53 |
| 2020/0186355 A1* | 6/2020 | Davies | H04L 9/3218 |
| 2020/0204527 A1* | 6/2020 | Vass | G06F 21/10 |
| 2020/0211571 A1 | 7/2020 | Shoa et al. | |
| 2020/0220746 A1* | 7/2020 | Shribman | H04W 48/18 |
| 2020/0252397 A1 | 8/2020 | Jass et al. | |
| 2020/0284883 A1* | 9/2020 | Ferreira | G01S 7/4816 |
| 2020/0304310 A1 | 9/2020 | Rule et al. | |
| 2020/0304542 A1 | 9/2020 | Ilincic et al. | |
| 2020/0344084 A1* | 10/2020 | Shribman | H04W 48/18 |
| 2020/0358858 A1* | 11/2020 | Shribman | G06F 9/547 |
| 2020/0364358 A1* | 11/2020 | Karia | G06Q 20/3829 |
| 2021/0007023 A1* | 1/2021 | Umapathy | H04W 36/00837 |
| 2021/0144517 A1* | 5/2021 | Guim Bernat | H04W 12/04 |
| 2022/0019698 A1* | 1/2022 | Durham | G06F 21/71 |
| 2022/0046114 A1* | 2/2022 | Entelis | H04L 12/40 |
| 2022/0103525 A1* | 3/2022 | Shribman | G06F 16/955 |
| 2023/0083633 A1* | 3/2023 | Desai | H04L 9/3273 726/19 |
| 2023/0091318 A1* | 3/2023 | Lindemann | H04L 63/0442 726/4 |

OTHER PUBLICATIONS

Nashwan et al "Mutual Chan Authentication Protocol for SPAN Transactions in Saudi Arabian Banking," International Journal of Computer and Communications Engineering, vol. 3, No. 5, Sep. 2014, pp. 326-333 (Year: 2014).*

Patnaik et al "Unique Identification System," International Journal of Computer Applications, vol. 7, No. 5, pp. 46-51 (Year: 2010).*

Zuo et al "Two-Way Real-Time Authentication System based on Dynamic Password and Multi-Biometric," 2012 International Conference on Computer Science and Service System, IEEE Computer Society, pp. 1254-1257 (Year: 2012).*

Mojzisova et al "Unified Platform for the Delivery of Notifications to Smartphones Notification," IEEE, pp. 490-494 (Year: 2012).*

Fugkeaw et al "Multi-Application Authentication based on Multi-Agent System," IAENG International Journal of Computer Science, 33:2, IJCS_33_2_6, pp. 1-6 (Year: 2007).*

(56) References Cited

OTHER PUBLICATIONS

Bhattacharjee et al "Biometric Entity Based Mutual Authentication Technique for 3-G Mobile Communications," International Journal of Computer Theory and Engineering, vol. 2, No. 1, pp. 26-30 (Year: 2010).*

Gunter et al "Internet Service Monitoring with Mobile Agents," IEEE, 2002, pp. 22-29 (Year: 2002.

* cited by examiner

TWO-WAY AUTHENTICATION SYSTEM AND METHOD

CROSS-REFERENCE TO RELATED APPLICATIONS

This application is a continuation of U.S. patent application Ser. No. 16/003,805, filed Jun. 8, 2018, the entire contents of which are incorporated herein by reference.

BACKGROUND

Increasingly businesses, financial institutions, and other entities are contacting their users (e.g., customers, account holders, subscribers, etc.) regarding products and services that the entities offer. Furthermore, entities are taking advantage of the many digital channels (e.g., mobile network, telephone lines, digital subscriber lines (DSL), WiFi network, local area network, wireless network, wide area network, etc.) that can be used to contact users. For example, an agent of a financial institution may telephone a user to determine if the user has recently made a large financial transaction using a specific account. Users may prefer to conduct business remotely using a digital channel rather than having to travel to a physical location of the entity, even if conducting business at a physical location of the entity is more secure. Accordingly, users are becoming increasingly complacent about answering questions regarding their business relationship with an entity over digital channels even if the user is unfamiliar with the individual calling on the entity's behalf.

The increasing use of digital channels gives fraudsters an opportunity to take advantage of users. For example, as users become accustomed to answering questions that may involve personal data, fraudsters are increasingly reaching out to users purporting to be an agent of an entity that the user conducts business with. While savvy users may be wary of revealing personal data, fraudsters prey on the helplessness of a user to verify that the individual is in fact an agent of the entity.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of two way authentication of customers and service agents. A method can include receiving a connection request to connect a customer and a service agent. The customer is authenticated for the service agent according to biometric data from the customer. The service agent is authenticated for the customer according by matching unique identifiers. A confirmation notification of the customer authentication is sent to the service agent. A confirmation notification of the service agent authentication is sent to the customer. A connection is established between the customer and the service agent according to the authentications and the connection request.

A system of the innovation can include a network component that receives a connection request to connect a customer and a service agent. A customer authentication component authenticates the customer for the service agent according to biometric authentication. A service agent component authenticates the service agent for the customer according to a unique identifier. A connection component establishes a connection between the customer and the service agent according to the authentications and the connection request.

In aspects, the subject innovation provides substantial benefits in terms of authentication and transactional security. One advantage resides in a more secure knowledge of the identity of a service agent that has contacted a customer. Another advantage resides in better relationship knowledge between the customer and a service agent.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
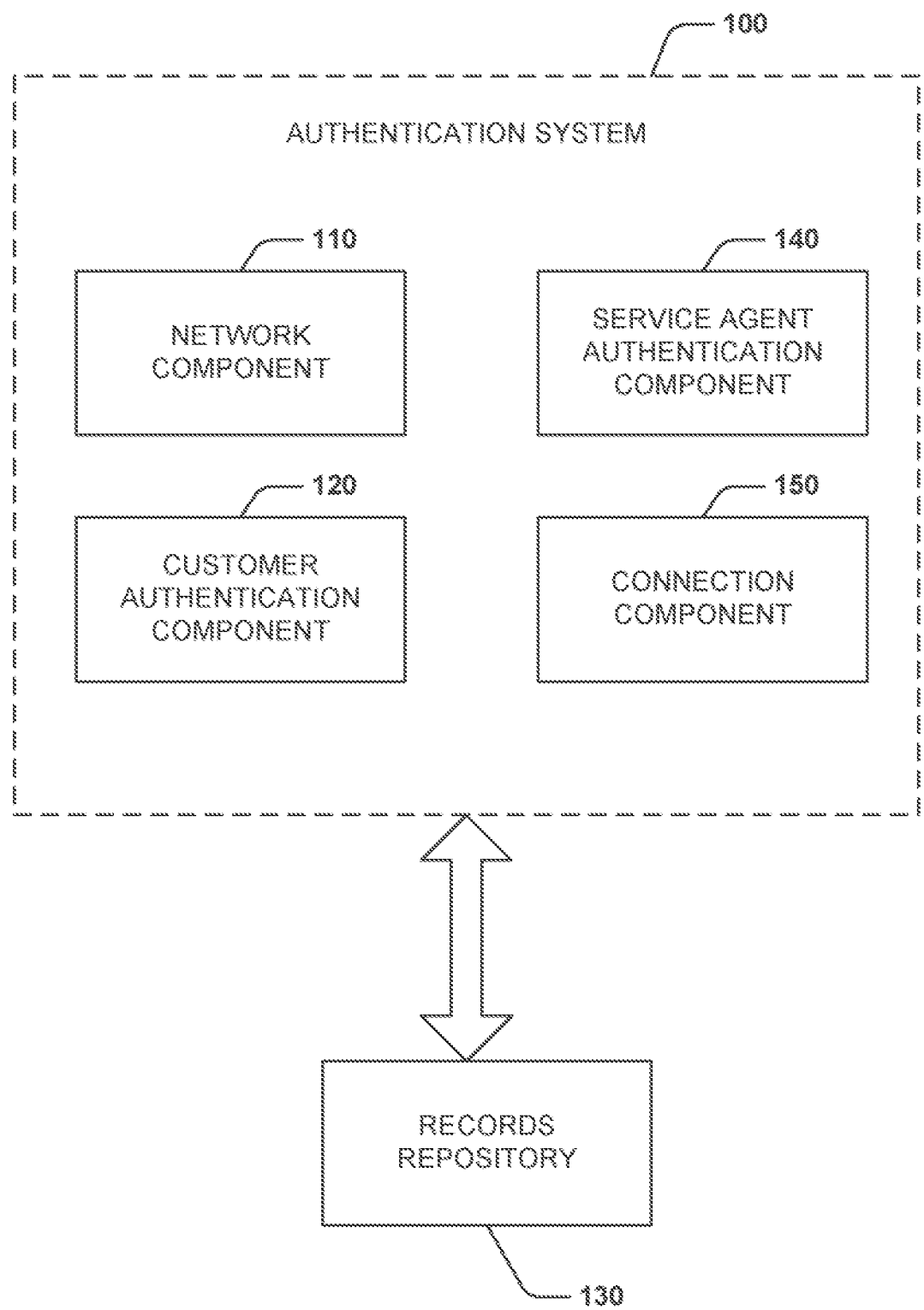
FIG. 1 illustrates an example component diagram of an authentication system of the present innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 1 illustrates an authentication system 1X) for authenticating a user and a service agent to each other to establish a connection. The authentication system 100 includes a network component 110. The network component 110 receives a connection request to connect a customer and a service agent. In some embodiments, the connection request is originated by the service agent. The service agent can be a person, machine (e.g. "bot"), automated system, and/or the like empowered to conduct transactions or provide information for an entity. In other embodiments, the connection request is originated by the customer. The customer may be a user or person that has registered with the entity to be provided services and/or be contacted by the entity. In some embodiments, the customer may be an automated agent of the customer such as a digital assistant, bot, device, and/or the like. The network component 110 receives the connection request over the internet, mobile network, application, API call, telephone, chat. SMS/MMS, other digital channels, and/or the like. In some embodiments, the connection between the customer and the service agent is to complete a financial transaction.

The authentication system 100 includes a customer authentication component 120. The customer authentication component 120 authenticates the customer's identity for the service agent according to a first authentication protocol. In some embodiments, the customer authentication component 120 can perform two factor authentication, and/or multi-factor authentication. The customer authentication component 120 can receive customer credentials from the customer upon receiving the connection request by the network component 110. In some embodiments, the connection request is forwarded to a customer device of the customer as well as a request for the customer to provide customer credentials using the customer device. The customer authentication component 120 can match the customer credentials to stored customer credentials associated with the customer. The stored customer credentials can be provided by a records repository 130 to the customer authentication component 120.

In some embodiments, the customer may be authenticated by the customer authentication component 120 when the received customer credentials match the stored customer credentials. In other embodiments, the customer authentication component 120 may use other authenticating data of the customer to authenticate the customer. The customer authentication component 120 can perform biometric authentication using biometric data of the customer. The customer authentication component 120 can request the customer provide biometric data via the customer device. In some embodiments, the biometric data can be a facial picture (e.g. a "selfie") captured in response to a prompt, fingerprint, and/or the like. In other embodiments, the biometric data is a fingerprint or a voice modulation. The customer authentication component 120 receives the biometric data of the customer from the customer device. The customer authentication component 120 verifies the biometric data of the customer with previously stored biometric data of the customer associated with the customer. The verification can be completed using a biometric recognition algorithm.

The customer authentication component 120 can receive the previously stored biometric data from the records repository 130. The previously stored biometric data can be submitted by the customer during a registration process. In some embodiments, a biometric mapping algorithm can be performed on the biometric data provided during the registration process. The biometric mapping algorithm facilitates matching (or not matching) the stored biometric data to future biometric data for authentication. The customer authentication component 120 can analyze the biometric data to determine whether it matches the previously stored biometric data. For example, the customer authentication component 120 receives an image of the customer's face from the customer device. The customer authentication component 120 can perform a facial recognition analysis to match the image to previously stored facial recognition data of the customer in the records repository to confirm the customer's identity.

In some embodiments, the customer authentication component 120 temporarily stores the image of the customer's face. After authentication, the customer authentication component 120 overwrites, flushes, deletes, and/or the like the image of the customer's face. The overwriting provides increased security for the customer such that the images sent to the customer authentication component 120 are not misused.

The authentication system 100 includes a service agent authentication component 140. The service agent authentication component 140 authenticates the service agent for the customer according to a second authentication protocol. The service agent authentication component 140 can receive a unique identifier from the service agent. In some embodiments, the unique identifier is a MAC address, IP address, session identification, and/or the like.

The service agent authentication component 140 can receive a known unique identifier associated with the service agent from the records repository 130. The service agent authentication component 140 verifies the unique identifier by matching it to the stored unique identifier associated with the service agent. In some embodiments, a notification of the verification can be sent to the customer and a notification of the customer authentication can be sent to the service agent such that each party can confirm the other has been authenticated by the authentication system 100.

The authentication system 100 includes a connection component 150. The connection component 150 determines whether a relationship between the customer and the service agent exists based on relevant needs of the customer and the service agent. In some embodiments, a relationship can be determined by analyzing third party system and/or business systems. For example, a business system may be a human resources database to determine whether a human service agent works for the entity or a device register registered with the entity. In some embodiments, the relationship can be determined based on previous historical interactions, success rate, and frequency of historical interactions recorded between a bot service agent and a bot customer. The relationship data (or status) can be stored in the records repository 130. If a relationship exists, the connection component 150 sends unique information of the service agent that indicates the relationship to the customer. The customer can confirm the relationship to the service agent as an extra security step.

If the connection component 150 determines a relationship does not exist between the customer and the service agent, the connection component 150 creates a new relationship between the customer and the service agent to be stored in the record repository 130. The connection component 150 sends unique information of the new relationship to the customer for the customer to confirm creating the new relationship. The customer can confirm or deny the relationship to the service agent as an extra security step.

The connection component 150 establishes a connection between the customer and the service agent according to the authentications and the connection request. In some embodiments, the connection component 150 establishes a connection over which transactions such as a financial transaction may be completed. The connection component 150 establishes the connection upon confirming or creating a relationship between the customer and the service agent.

Figure 2:
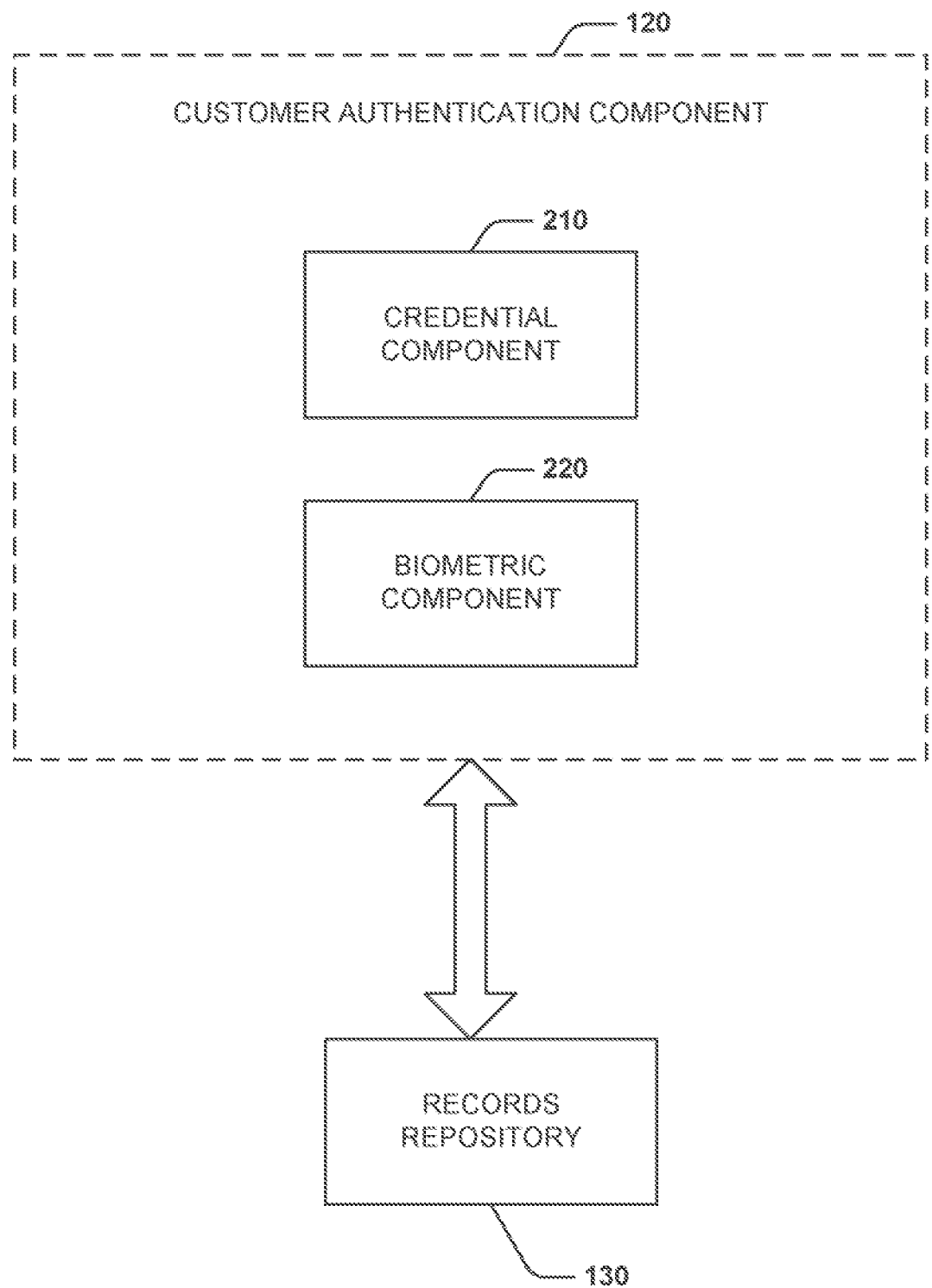
FIG. 2 illustrates an example component diagram of a customer authentication component.

FIG. 2 illustrates a detailed component diagram of the customer authentication component 120. The customer authentication component 120 authenticates the customer's identity for the service agent according to a first authentication protocol. In some embodiments, the customer authentication component 120 can complete two factor authentication, and/or multi-factor authentication.

The customer authentication component 120 includes a credential component 210. The credential component 210 receives customer credentials from the customer upon receiving the connection request by the network component 110. In some embodiments, the connection request is forwarded to a customer device of the customer as well as a request for the customer to provide customer credentials using the customer device. In other embodiments, the credential component 210 can request stored customer credentials from the records repository 130. The credential component 210 matches the customer credentials received from the customer device to the stored customer credentials associated with the customer.

For example, a connection request is received by the network component 110. The credential component 210, in response to the connection request, sends a credential request to the customer device and the records repository. The customer device responds with customer credentials input by the customer or stored on the customer device. The records repository response with stored customer credentials associated with the customer. In some embodiments, the credentials are a password, key, passcode, and/or the like. In other embodiments, the credentials can be a unique token stored on the customer device.

In some embodiments, the customer may be authenticated by the customer authentication component 120 and/or the credential component 210 when the received customer credentials match the stored customer credentials. In other embodiments, the customer authentication component 120 may use further authenticating data of the customer to authenticate the customer. The customer authentication component 120 includes a biometric component 220 that performs biometric authentication using biometric data of the customer. The biometric component 220 can request the customer provide biometric data via the customer device. In some embodiments, the biometric data can be a facial picture (e.g. selfie) captured in the instant, a fingerprint, and/or the like. The biometric component 220 receives the biometric data of the customer from the customer device. The biometric component 220 can request stored biometric data associated with the customer from the records repository 150. The biometric component 220 verifies the biometric data of the customer with the stored biometric data of the customer associated with the customer.

The biometric component 220 can receive the previously stored biometric data from the records repository 130. The previously stored biometric data can be submitted by the customer during a registration process at an earlier time. The biometric component 220 can analyze the biometric data to determine whether it matches the previously stored biometric data. For example, the biometric component 220 receives an image of the customer's face from the customer device. The biometric component 220 can perform a facial recognition analysis to match the image to previously stored facial recognition data of the customer in the records repository 150.

In some embodiments, the biometric component 220 temporarily stores the image of the customer's face. After an authentication decision, the biometric component 220 overwrites, flushes, deletes, and/or the like the image of the customer's face. The overwriting provides increased security for the customer such that the images sent to the biometric component 220 are not misused.

Figure 3:
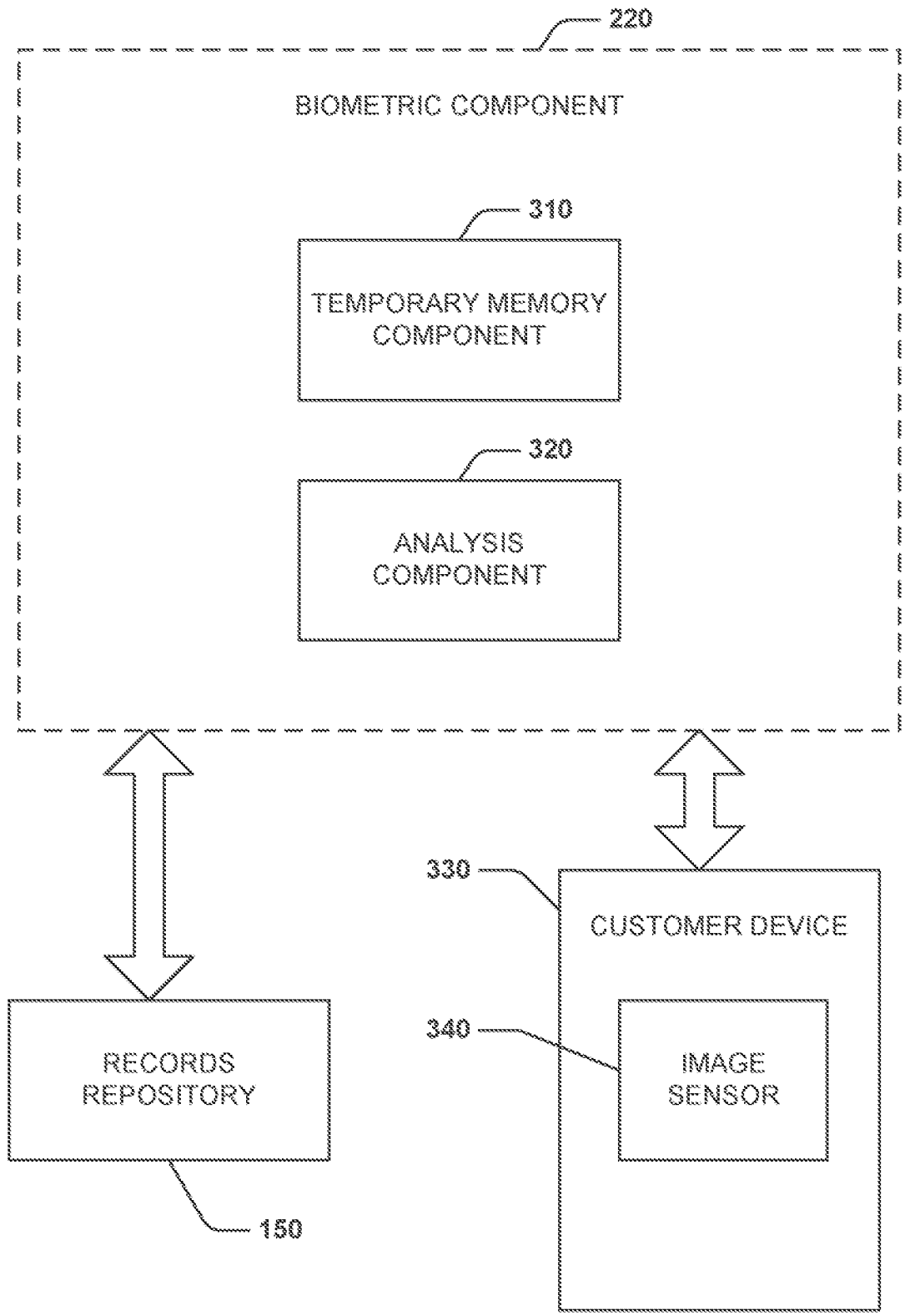
FIG. 3 illustrates an example component diagram of a biometric component.

FIG. 3 illustrates a component diagram of a biometric component 220. The biometric component 220 performs biometric authentication using biometric data of the customer. The biometric component 220 includes a temporary memory component 310. The temporary memory component 310 stores images of the customer's face during authentication. In some embodiments, the temporary memory component 310 is a hard disk drive, solid state drive, networked storage, cloud storage, database, and/or the like. After an authentication decision, the temporary memory component 310 overwrites, flushes, deletes, and/or the like the image of the customer's face. The overwriting provides increased security for the customer such that the images sent to the biometric component 220 are not misused or stolen.

The biometric component 220 includes an analysis component 320. The analysis component 320 can request the customer provide biometric data via a customer device 330. In some embodiments, the customer device 330 includes an image sensor 340. The image sensor can be a still camera, video camera, and/or other means for capturing images of the customer. In some embodiments, the biometric data can be a facial picture (e.g. selfie) captured in the instant, a fingerprint and/or the like. The analysis component 320 receives the biometric data of the customer from the customer device 330. The analysis component 320 can request stored biometric data associated with the customer from the records repository 130. The analysis component 320 verifies the biometric data of the customer with the stored biometric data of the customer associated with the customer.

The temporary memory component 310 can receive the previously stored biometric data from the records repository 130. The previously stored biometric data can be submitted by the customer during a registration process at an earlier time. The analysis component 320 analyzes the biometric data to determine whether it matches the previously stored biometric data. For example, the analysis component 320 receives an image of the customer's face from the temporary memory component 310 via the image sensor 340 of the customer device 330. The analysis component 320 performs a facial recognition analysis to match the image to previously stored facial recognition data of the customer 150. If the analysis confirms the faces in the images are the customer's, the customer is authenticated by the biometric component 220. If the images do not match, the customer is not authenticated. Authentication confirmation can be provided to the service agent as described above.

In some embodiments, the analysis component 320 can process the received image for tampering detection using tamper detection algorithms. The analysis component 320 can utilize tamper detection algorithms to verify that the received image is genuine and has not been edited to overcome the authentication techniques described above. In some embodiments, the image tampering algorithm is a passive algorithm that looks only at the received image for inconsistencies such as lighting or manipulation of the raw data of the image.

Figure 4:
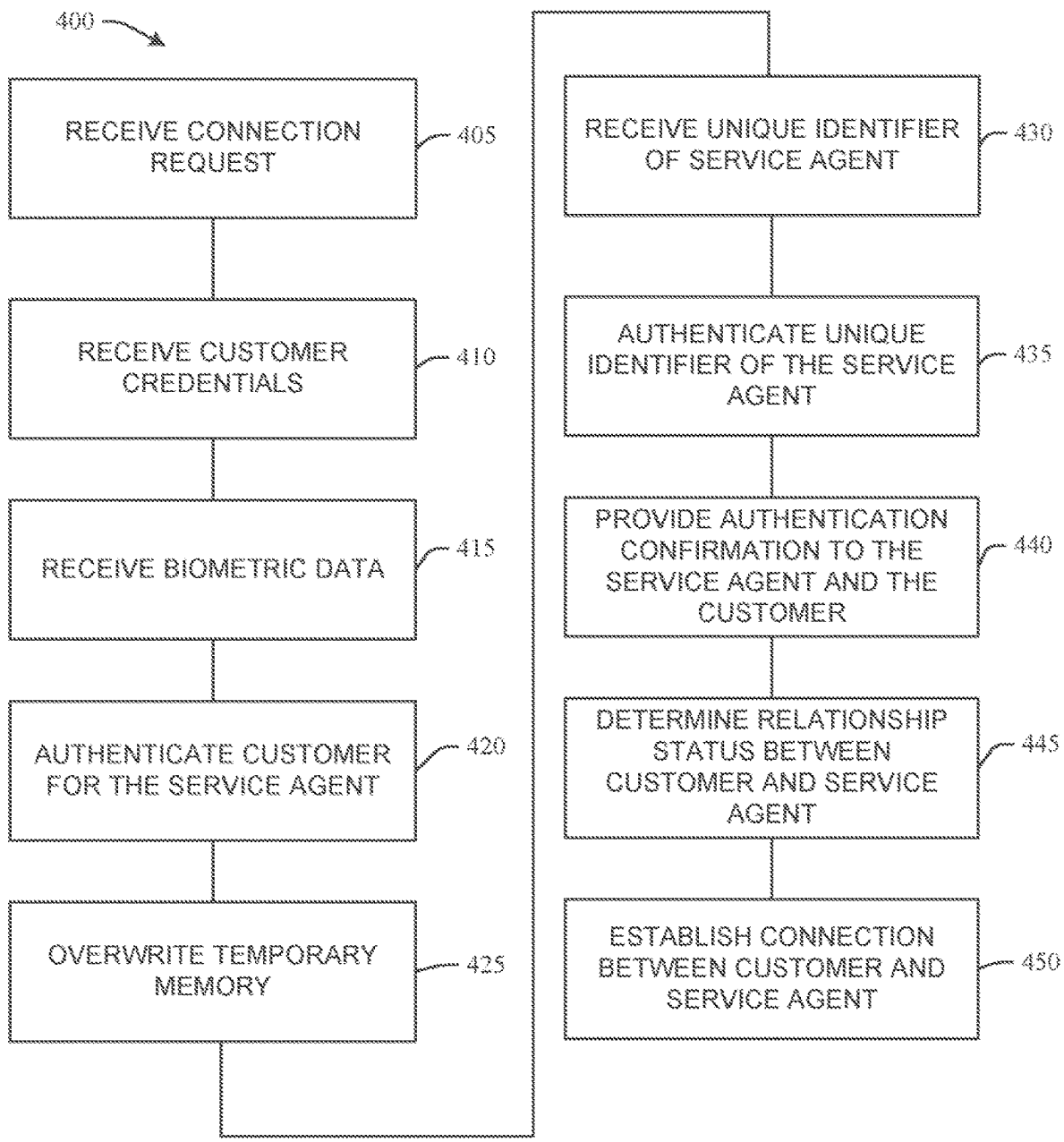
FIG. 4 illustrates a method for authenticating customers and service agents.

With reference to FIG. 4, example method 400 is depicted for authenticating a customer and service agent. While, for purposes of simplicity of explanation, the one or more methodologies shown herein. e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 400 is described in conjunction with a specific example is for explanation purposes.

FIG. 4 illustrates a method 400 for authenticating a user and a service agent to each other to establish a connection. At 405, a connection request is received to connect a customer and a service agent. In some embodiments, the connection request can be to complete financial transactions, exchange confidential information, and/or the like. The customer can be a registered user with an entity such as a financial institution. The service agent can be an automated digital agent (bot) that can complete financial transactions, provide information, complete customer requests, and/or the like residing on systems or networks of the financial institution. At 410, customer credentials are received to identify a customer account. The customer credentials can be a password, passcode, one-time code, username, and/or the like to identify the customer. At 415, biometric data is received of the customer. The biometric data can be a facial picture of the customer that the customer takes after the connection request is received. In some embodiments, the biometric data can be a video, a fingerprint, a palm print, and/or other biometric data. In some embodiments, the biometric data is stored in a temporary memory. At 420, the customer is authenticated for the service agent according to the customer credentials and/or the biometric data. The customer credentials are verified to determine a match to previously stored customer credentials. The biometric data of the customer is analyzed against previously stored biometric data of the customer that is associated with the customer account. If both match, the customer is authenticated. At 425, the temporary memory is overwritten, deleted, or otherwise removed after the customer is authenticated.

At 430, a unique identifier is received for the service agent. The unique identifier can be a mac address. IP address, token, serial number, and/or the like to distinguish the service agent. At 435, the unique identifier is authenticated to match a stored unique identifier associated with the service agent. At 440, verification confirmations are provided to the service agent and the customer. The confirmations indicate to the customer that the service agent has been authenticated and to the service agent that the customer has been authenticated. This provides security for both parties to be ensured that fraud is not happening on either side of the connection.

At 445, a relationship status is determined between the customer and service agent. If a relationship exists, unique information of the service agent that indicates the relationship is sent to the customer. The customer can confirm the relationship to the service agent as an extra security step. If a relationship does not exist between the customer and the service agent, a new relationship is created between the customer and the service agent to be stored in the record repository 130. Unique information of the new relationship is sent to the customer for the customer to confirm creating the new relationship.

At 450, establishing a connection between the customer and the service agent according to the authentications and the connection request. The connection is established over which transactions such as a financial transaction may be completed. In some embodiments, the connection can be established upon confirming or creating a relationship between the customer and the service agent.

Figure 5:
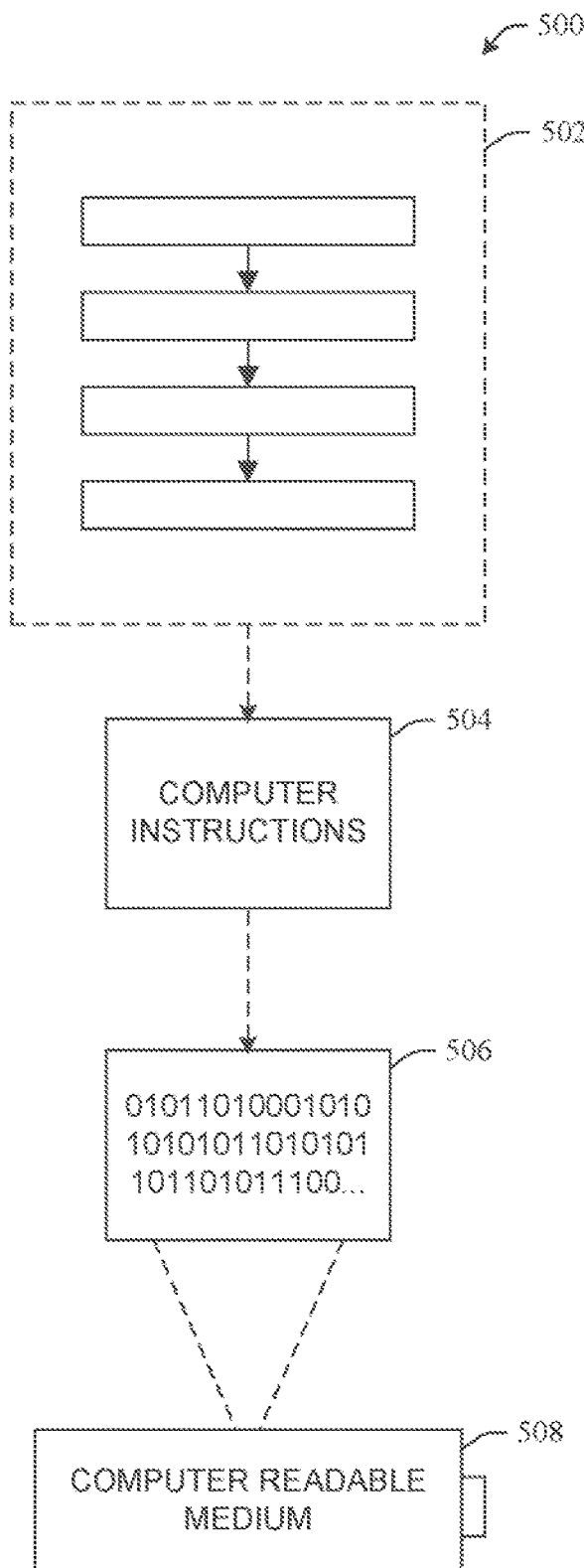
FIG. 5 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 5, wherein an implementation 500 comprises a computer-readable medium 508, such as a CD-R, DVD-R, flash drive, a platter of a hard disk drive, etc., on which is encoded computer-readable data 506, his computer-readable data 506, such as binary data comprising a plurality of zero's and one's as shown in 506, in turn comprises a set of computer instructions 504 configured to operate according to one or more of the principles set forth herein. In one such embodiment 500, the processor-executable computer instructions 504 is configured to perform a method 502, such as at least a portion of one or more of the methods described in connection with embodiments disclosed herein. In another embodiment, the processor-executable instructions 504 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 6:
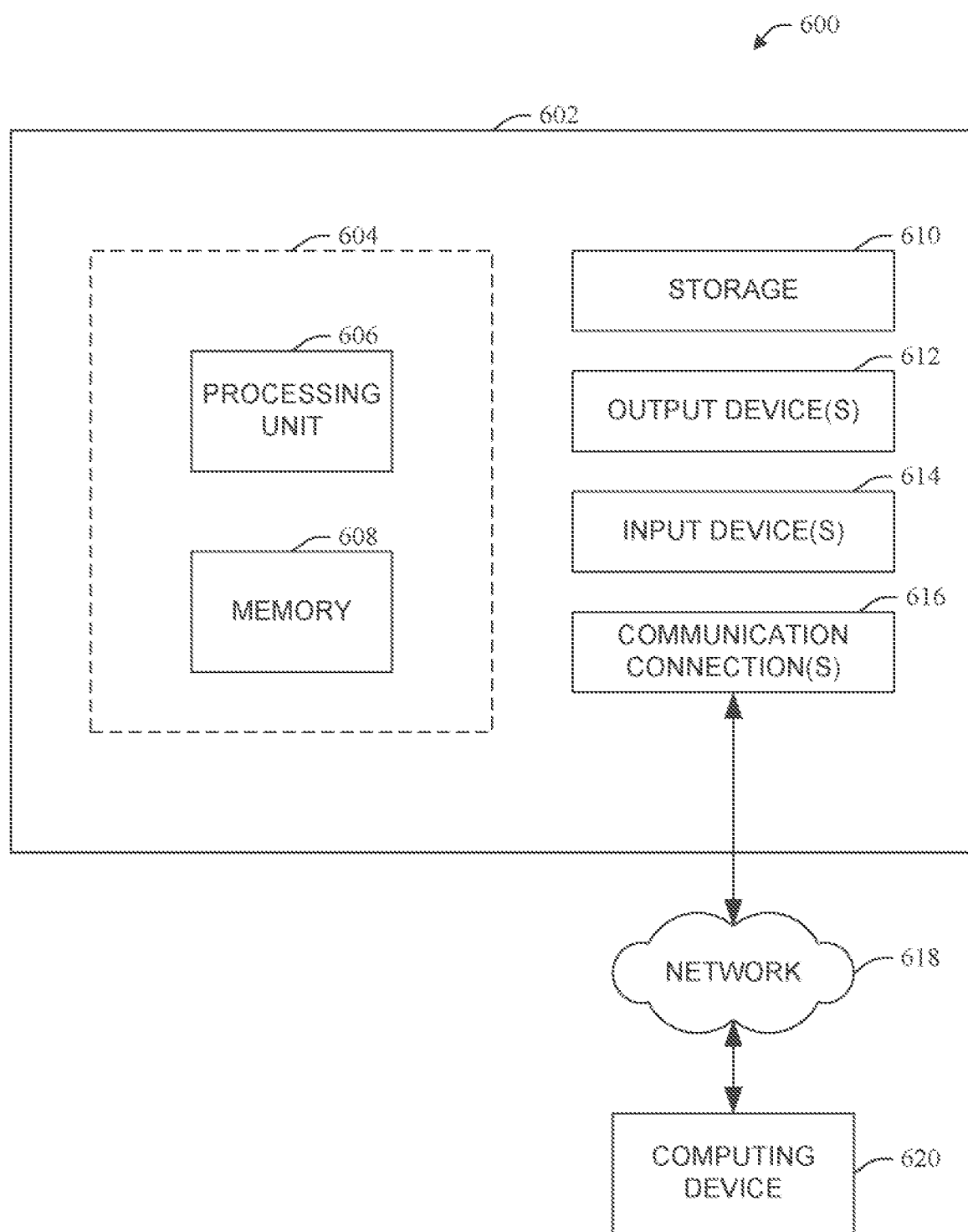
FIG. 6 illustrates a computing environment where one or more of the provisions set forth herein can be implemented, according to some embodiments.

With reference to FIG. 6 and the following discussion provide a description of a suitable computing environment in which embodiments of one or more of the provisions set forth herein can be implemented. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 6 illustrates a system 600 comprising a computing device 602 configured to implement one or more embodiments provided herein. In one configuration, computing device 602 can include at least one processing unit 606 and memory 608. Depending on the exact configuration and type of computing device, memory 608 may be volatile, such as RAM, non-volatile, such as ROM, flash memory, etc., or some combination of the two. This configuration is illustrated in FIG. 6 by dashed line 604.

In these or other embodiments, device 602 can include additional features or functionality. For example, device 602 can also include additional storage such as removable storage or non-removable storage, including, but not limited to, magnetic storage, optical storage, and the like. Such additional storage is illustrated in FIG. 6 by storage 610. In some embodiments, computer readable instructions to implement one or more embodiments provided herein are in storage 610. Storage 610 can also store other computer readable instructions to implement an operating system, an application program, and the like. Computer readable instructions can be accessed in memory 608 for execution by processing unit 606, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 608 and storage 610 are examples of computer storage media. Computer storage media includes, but is not limited to, RAM, ROM. EEPROM, flash memory or other memory technology. CD-ROM. Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media can be part of device 602.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 602 can include one or more input devices 614 such as keyboard, mouse, pen, voice input device, touch input device, infrared cameras, video input devices, or any other input device. One or more output devices 612 such as one or more displays, speakers, printers, or any other output device can also be included in device 602. The one or more input devices 614 and/or one or more output devices 612 can be connected to device 602 via a wired connection, wireless connection, or any combination thereof in some embodiments, one or more input devices or output devices from another computing device can be used as input device(s) 614 or output device(s) 612 for computing device 602. Device 602 can also include one or more communication connections 616 that can facilitate communications with one or more other devices 620 by means of a communications network 618, which can be wired, wireless, or any combination thereof, and can include ad hoc networks, intranets, the Internet, or substantially any other communications network that can allow device 602 to communicate with at least one other computing device 620.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be incisive in a manner similar to the term "comprising" as "comprising" is interpreted when employed as a transitional word in a claim.

The invention claimed is:

1. A method for two-way authentication, the method comprising:
   receiving a request to connect a user and an agent;
   authenticating the user according to a first authentication protocol comprising:
   receiving a facial image of the user,
   storing the facial image in a temporary memory,
   processing the facial image of the user using a tamper detection algorithm to verify the facial image of the user has not been edited,
   verifying the facial image of the user with a previously stored facial image of the user, and
   overwriting the temporary memory after authenticating the user such that the facial image is removed from the temporary memory;
   authenticating the agent according to a second authentication protocol different from the first authentication protocol, wherein the second authentication protocol comprises:
   receiving a unique identifier from the agent, wherein the unique identifier comprises one of a Media Access Control (MAC) address or an Internet Protocol (IP) address, and
   verifying the unique identifier with a stored unique identifier associated with the agent;
   providing a notification of the authentication of the user to the agent;
   providing a notification of the authentication of the agent to the user; and
   establishing a connection between the user and the agent based on the agent being authenticated, the user being authenticated, and the request.

2. The method of claim 1, wherein the first authentication protocol comprises:
   receiving biometric data from the user; and
   verifying the biometric data with previously stored biometric data associated with the user.

3. The method of claim 1, authenticating the user according to the first authentication protocol further comprises:
   directing the user to capture the facial image of the user.

4. The method of claim 3, wherein verifying the facial image with the previously stored facial image of the user comprises:

comparing the facial image to the previously stored facial image of the user using a facial recognition algorithm.

5. The method of claim 1, wherein the first authentication protocol comprises:
   receiving credential from the user, and
   verifying the credentials match stored credentials associated with the user.

6. The method of claim 1, wherein the agent comprises a digital assistant.

7. The method of claim 1, wherein the notification of the authentication of the agent provided to the user comprises information based on one or more historical interactions between the user and the agent.

8. A system for two-way authentication, the system comprising:
   one or more processors having instructions to control components implemented in hardware within the system, the components comprising:
   a network component configured to receive a connection request to connect a user and an agent;
   a customer authentication component configured to authenticate the user according to a first authentication protocol and provides a notification of the authentication of the user to the agent, wherein the first authentication protocol comprises:
   receiving a facial image of the user,
   storing the facial image in a temporary memory,
   processing the facial image of the user using a tamper detection algorithm to verify the facial image of the user has not been edited,
   verifying the facial image of the user with a previously stored facial image of the user, and
   overwriting the temporary memory after authenticating the user such that the facial image is removed from the temporary memory;
   a service agent component configured to authenticate the agent according to a second authentication protocol, different from the first authentication protocol, and provides a notification of the authentication of the agent to the user, wherein the second authentication protocol comprises:
   receiving a unique identifier from the agent, wherein the unique identifier comprises one of a Media Access Control (MAC) address or an Internet Protocol (IP) address, and
   verifying the unique identifier with a stored unique identifier associated with the agent; and
   a connection component configured to establish a connection between the user and the agent based on the agent being authenticated, the user being authenticated, and the request.

9. The system of claim 8, wherein the customer authentication component comprises a biometric component configured to:
   receive biometric data from the user; and
   verify the biometric data with previously stored biometric data associated with the user.

10. The system of claim 8, wherein the authenticating the user according to the first authentication protocol further comprises:
    directing the user to capture the facial image of the user.

11. The system of claim 10, wherein the customer authentication component is configured to verify the facial image of the user with the previously stored facial image of the user by:
    comparing the facial image to the previously stored facial image of the user using a facial recognition algorithm.

12. The system of claim 8, wherein the customer authentication component comprises a credential component configured to:
    receive credentials from the user, and
    verify the credentials match stored credentials associated with the user.

13. The system of claim 8, wherein the agent comprises a digital assistant.

14. The system of claim 8, wherein the notification of the authentication of the agent provided to the user comprises information based on one or more historical interactions between the user and the agent.

15. A non-transitory computer-readable medium for two-way authentication, the non-transitory computer-readable medium storing instructions that, when executed, cause one or more processors to:
    receive a request to connect a user and an agent;
    authenticate the user according to a first authentication protocol comprising:
    receiving a facial image of the user,
    storing the facial image in a temporary memory,
    processing the facial image of the user using a tamper detection algorithm to verify the facial image of the user has not been edited,
    verifying the facial image of the user with a previously stored facial image of the user, and
    overwriting the temporary memory after authenticating the user such that the facial image is removed from the temporary memory;
    authenticate the agent according to a second authentication protocol different from the first authentication protocol, wherein the second authentication protocol comprises:
    receiving a unique identifier from the agent, wherein the unique identifier comprises one of a Media Access Control (MAC) address or an Internet Protocol (IP) address, and
    verifying the unique identifier with a stored unique identifier associated with the agent;
    provide a notification of the authentication of the user to the agent;
    provide a notification of the authentication of the agent to the user; and
    establish a connection between the user and the agent based on the agent being authenticated, the user being authenticated, and the request.

16. The non-transitory computer-readable medium of claim 15, wherein the first authentication protocol comprises:
    receiving biometric data from the user; and
    verifying the biometric data with previously stored biometric data associated with the user.

17. The non-transitory computer-readable medium of claim 15,
    authenticating the user according to the first authentication protocol further comprises:
    directing the user to capture a facial image of the user, and
    wherein verifying the facial image of the user with the previously stored facial image of the user comprises:
    comparing the facial image to the previously stored facial image of the user using a facial recognition algorithm.

18. The non-transitory computer-readable medium of claim 15, wherein the first authentication protocol comprises:
    receiving credential from the user, and
    verifying the credentials match stored credentials associated with the user.

19. The non-transitory computer-readable medium of claim 15, wherein the agent comprises a digital assistant.

20. The non-transitory computer-readable medium od of claim 15, wherein the notification of the authentication of the agent provided to the user comprises information based on one or more historical interactions between the user and the agent.

\* \* \* \* \*